(12) United States Patent
Hirose et al.

(10) Patent No.: US 9,281,524 B2
(45) Date of Patent: Mar. 8, 2016

(54) METAL AIR BATTERY

(71) Applicants: Yutaka Hirose, Susono (JP); Sanae Okazaki, Suntou-gun (JP); Fuminori Mizuno, Ann Arbor, MI (US)

(72) Inventors: Yutaka Hirose, Susono (JP); Sanae Okazaki, Suntou-gun (JP); Fuminori Mizuno, Ann Arbor, MI (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 225 days.

(21) Appl. No.: 14/036,717

(22) Filed: Sep. 25, 2013

(65) Prior Publication Data

US 2014/0147755 A1  May 29, 2014

(30) Foreign Application Priority Data

Sep. 25, 2012 (JP) .................................. 2012-211329

(51) Int. Cl.
*H01M 4/86* (2006.01)
*H01M 12/08* (2006.01)
*H01M 12/04* (2006.01)
*H01M 12/06* (2006.01)

(52) U.S. Cl.
CPC ............ *H01M 4/8663* (2013.01); *H01M 12/04* (2013.01); *H01M 12/06* (2013.01); *H01M 12/065* (2013.01); *H01M 12/08* (2013.01); Y02E 60/50 (2013.01)

(58) Field of Classification Search
CPC ... H01M 4/8663; H01M 12/04; H01M 12/06; H01M 12/08; H01M 12/065; Y02E 60/50
USPC .......................................................... 429/405
See application file for complete search history.

(56) References Cited

U.S. PATENT DOCUMENTS

| | | | |
|---|---|---|---|
| 2005/0053818 A1* | 3/2005 | St-Arnaud et al. | 429/30 |
| 2008/0176124 A1* | 7/2008 | Imagawa et al. | 429/27 |
| 2014/0004428 A1* | 1/2014 | Nakamoto | 429/403 |

FOREIGN PATENT DOCUMENTS

| | | |
|---|---|---|
| JP | A-2004-296108 | 10/2004 |
| JP | A-2007-5267 | 1/2007 |
| JP | A-2008-41502 | 2/2008 |
| JP | A-2012-43638 | 3/2012 |
| JP | A-2012-49047 | 3/2012 |
| JP | A-2012-54039 | 3/2012 |

OTHER PUBLICATIONS

Incorporated Administrative Agency, National Institute of Advanced Industrial Science and Technology, "High Performance Lithium Air Battery with New Structure was Developed," online press release dated Feb. 24, 2009 http://www.aist.go.jp/aist_i/press_release/pr2009/pr20090224/pr20090224.html (with translation).

* cited by examiner

*Primary Examiner* — Milton I Cano
*Assistant Examiner* — Ling R Zeng
(74) *Attorney, Agent, or Firm* — Oliff PLC

(57) ABSTRACT

The invention provides a metal air battery with improved discharge characteristics compared to conventional ones. This is achieved by a metal air battery including a positive electrode layer, a negative electrode layer, and an electrolyte layer positioned between the positive electrode layer and the negative electrode layer, wherein the positive electrode layer includes an electroconductive material, a binder, and a $SiO_2$ particle, and wherein the $SiO_2$ particle has a specific surface area of 16.7 $m^2/g$ or less.

9 Claims, 5 Drawing Sheets

METAL AIR BATTERY

TECHNICAL FIELD

The present invention relates to a metal air battery that utilizes oxygen as an active material for a positive electrode.

BACKGROUND ART

With the recent spread and progress of appliances such as a cell phone, a higher capacity battery as a power source has been asked for. In such situation, a metal air battery has drawn attention as a high capacity battery superior to a lithium-ion battery which is currently used generally, since an oxidation-reduction reaction of the oxygen is performed at a positive electrode (air electrode) by utilizing oxygen in the air as an active material for the positive electrode, and an oxidation-reduction reaction of a metal constituting a negative electrode is performed at the negative electrode, so that charging and discharging are possible allowing high energy density (Non Patent Literature 1).

However, there remain drawbacks to be overcome in a metal air battery. For example, it has been proposed that high surface area $SiO_2$ should be mixed into a positive electrode material so as to improve capacity or coulombic efficiency (Patent Literature 1).

CITATION LIST

Patent Literature

[Patent Literature 1] Japanese Laid-open Patent Publication No. 2012-49047

Non Patent Literature

[Non Patent Literature 1] Incorporated Administrative Agency, National Institute of Advanced Industrial Science and Technology: "High performance lithium air battery with new structure was developed", online press release dated 24 Feb. 2009, (searched on the internet on 19 Aug. 2011 at <http://www.aist.go.jp/aist_j/press_release/pr2009/pr20090224/pr20090224.html>)

SUMMARY OF INVENTION

Technical Problem

As described in Patent Literature 1, etc., various trials have been heretofore undertaken with an object to improve the characteristics of a metal air battery. However, a metal air battery with further improved characteristics is still desired. In particular, a metal air battery has a drawback in that the discharge reaction rate is about an order of magnitude less than a lithium-ion battery, and a metal air battery whose discharge characteristics are improved from a conventional level is desired.

Solution to Problem

The present invention relates to a metal air battery comprising a positive electrode layer, a negative electrode layer, and an electrolyte layer positioned between the positive electrode layer and the negative electrode layer, wherein the positive electrode layer comprises an electroconductive material, a binder, and a $SiO_2$ particle, and wherein the $SiO_2$ particle has a specific surface area of 16.7 $m^2/g$ or less.

Advantageous Effects of Invention

The present invention can provide a metal air battery with improved discharge characteristics compared to conventional ones.

DESCRIPTION OF EMBODIMENTS

Figure 1:
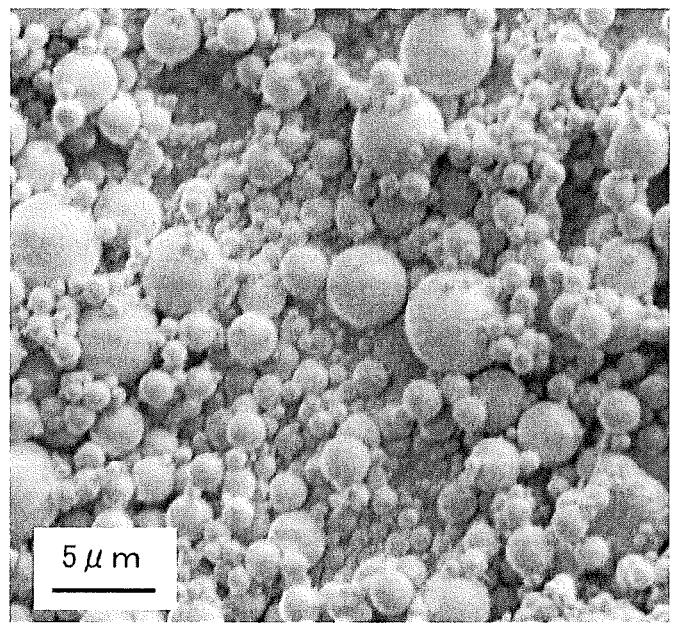
FIG. 1 is a scanning electron microscope (SEM) photograph of a $SiO_2$ particle having a low surface area, which is usable in the present invention.

A metal air battery according to the present invention includes a positive electrode layer, a negative electrode layer, and an electrolyte layer positioned between the positive electrode layer and the negative electrode layer, wherein the positive electrode layer contains an electroconductive material, a binder, and a $SiO_2$ particle, and wherein the $SiO_2$ particle has a specific surface area of 16.7 $m^2/g$ or less.

It is necessary to facilitate metal ion conduction in a positive electrode in order to improve the discharge characteristics of a metal air battery. The inventors studied intensively to find that the discharge reaction rate can be improved by mixing a $SiO_2$ particle having a low specific surface area in a positive electrode.

The specific surface area of the $SiO_2$ particle is 16.7 $m^2/g$ or less, preferably 11.5 $m^2/g$ or less, and more preferably 5.1 $m^2/g$ or less.

Surprisingly, it has come to be known that a discharge reaction of a metal air battery can be facilitated by adding a $SiO_2$ particle having a low specific surface area to a positive electrode. The smaller the specific surface area of a $SiO_2$ particle added to a positive electrode is, the better the discharge reaction of a metal air battery that can be promoted.

While not wishing to be bound by theory, when a $SiO_2$ particle is mixed in a positive electrode, it is conceivable that an electrostatic force develops on the surface of the $SiO_2$ particle to facilitate conduction of a metal ion such as a lithium ion. If a $SiO_2$ particle with high specific surface area is mixed in a positive electrode, the metal ion conduction path becomes long and the promotion effect of a discharge reaction becomes weaker. While, the smaller the specific surface area of a $SiO_2$ particle mixed in a positive electrode is, the shorter the metal ion conduction path becomes, and conceivably the discharge reaction rate can be improved.

Although there is no particular restriction on the lower limit of the specific surface area of the $SiO_2$ particle, based on the above mechanism, the specific surface area of the $SiO_2$ particle may be, for example, 0.1 $m^2/g$ or more.

The specific surface area of the $SiO_2$ particle may be measured by a volumetric gas adsorption method using a $N_2$ gas, etc., as an adsorbate.

The $SiO_2$ particle is preferably nonporous. The nonporous $SiO_2$ particle means a $SiO_2$ particle having no visible pore on the surface thereof, and more specifically, a $SiO_2$ particle having surface appearances as shown by scanning electron microscope (SEM) photographs of FIGS. 1 to 4. Therefore, it is conceivable that if a $SiO_2$ particle is nonporous, the specific surface area of the $SiO_2$ particle can be smaller accordingly, and the metal ion conduction path can be made shorter.

The particle shape of the $SiO_2$ particle is preferably spherical. The spherical $SiO_2$ particle can have a smaller specific surface area. More specifically, the ratio of the major axis to the minor axis (the ratio is hereinafter referred to as "sphericity") of a primary particle of $SiO_2$ is preferably 0.8 to 1.0, more preferably 0.9 to 1.0, and further preferably 0.95 to 1.0.

The sphericity can be measured based on an observation image of a scanning electron microscope (SEM), etc. For example, the average value of the ratios of the major axis to the minor axis of a $SiO_2$ particle measured with respect to a plurality, for example, approximately 30 to 100, of primary particles of $SiO_2$ may be determined as the sphericity. A $SiO_2$ particle with a smaller specific surface area can be obtained more easily when the sphericity thereof is within the above range.

The average particle diameter of the $SiO_2$ particle is preferably 0.25 to 20.00 μm, more preferably 0.25 to 10.00 μm, further preferably 0.25 to 5.00 μm, and further more preferably 0.25 to 2.20 μm. The average particle diameter of the $SiO_2$ particle can be measured by a laser diffraction scattering particle size distribution analyzer. A $SiO_2$ particle with a smaller specific surface area can be obtained more easily when the average particle diameter thereof is within the above range.

The content of the $SiO_2$ particle contained in the positive electrode layer is preferably 1 to 60 wt %, more preferably 5 to 45 wt %, and further preferably 10 to 30 wt %, based on the total weight of the positive electrode layer.

The positive electrode layer contains an electroconductive material, a binder, and a $SiO_2$ particle, and a higher discharge reaction characteristic can be attained when the content of the $SiO_2$ particle based on the total weight of the positive electrode layer is within the above range.

The ratio of the content of the $SiO_2$ particle to the content of the electroconductive material contained in the positive electrode layer is preferably 0.01 to 6.00, more preferably 0.08 to 1.80, and further preferably 0.17 to 0.75. A higher discharge reaction characteristic can be attained when the ratio of the content of the $SiO_2$ particle to the content of the electroconductive material in the positive electrode layer is within the above range.

While, the ratio of the content of the $SiO_2$ particle to the content of the binder contained in the positive electrode layer is preferably 0.03 to 2.00, more preferably 0.17 to 1.50, and further preferably 0.33 to 1.00. A higher discharge reaction characteristic can be attained when the ratio of the content of the $SiO_2$ particle to the content of the binder in the positive electrode layer is within the above range.

The electroconductive material contained in the positive electrode layer is, but not limited thereto, preferably a porous material. Examples of the porous material include a carbon material such as carbon, and examples of the carbon include carbon black, such as Ketjen black, acetylene black, channel black, furnace black, and mesoporous carbon; active carbon; and a carbon fiber; and a carbon material with a large specific surface area is preferably used. Further, the porous material has preferably a pore volume of in a range of approximately 1 mL/g and a pore size of a nanometer order. The electroconductive material occupies preferably 10 to 99 wt %, more preferably 10 to 70 wt %, further preferably 25 to 65 wt %, and further more preferably 40 to 60 wt % in the positive electrode layer.

Examples of the binder contained in the positive electrode layer include a fluorocarbon resin, such as polytetrafluoroethylene (PTFE), polyvinylidene-fluoride (PVdF), and a fluorocarbon rubber; a thermoplastic resin, such as polypropylene, polyethylene, and polyacrylonitrile, and a styrene butadiene rubber (SBR). The binder occupies preferably 1 to 60 wt %, more preferably 10 to 50 wt %, and further preferably 20 to 40 wt % in the positive electrode layer.

The positive electrode layer may contain an oxidation-reduction catalyst. Examples of the oxidation-reduction catalyst include a metallic oxide, such as manganese dioxide, cobalt oxide, and cerium oxide; a noble metal, such as Pt, Pd, Au, and Ag; a transition metal such as Co; a metal phthalocyanine such as cobalt phthalocyanine; and an organic material such as Fe-porphyrin. The oxidation-reduction catalyst occupies preferably 1 to 90 wt %, more preferably 1 to 50 wt %, and further preferably 1 to 30 wt % in the positive electrode layer.

The electrolyte layer in the metal air battery according to the present invention conducts metal ions such as lithium ions between the positive electrode layer and the negative electrode layer, and may contain a liquid electrolyte, a gel electrolyte, a polymer electrolyte, a solid electrolyte, or a combination thereof. The liquid electrolyte and the gel electrolyte may penetrate into pores (voids) in the air electrode layer, and fill at least a part of the pores in the positive electrode layer.

As the liquid electrolyte which may be contained in the electrolyte layer, a liquid which can exchange metal ions between the positive electrode layer and the negative electrode layer can be used. The liquid may be an aprotic organic solvent, an ionic liquid, or the like.

Examples of the organic solvent include propylene carbonate, ethylene carbonate, diethyl carbonate, dimethyl carbonate, ethyl methyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N,N-dimethylformamide, dimethyl sulfoxide, sulfolane, γ-butyrolactone, and glymes.

The ionic liquid are preferably those having high resistance to an oxygen radical and being able to suppress a side reaction, and examples thereof include N,N-diethyl-N-methyl-N-(2-methoxyethyl)ammonium bis(trifluoromethanesulfonyl)amide (DEMETFSA), N-methyl-N-propylpiperidinium bis(trifluoromethanesulfonyl)amide (PP13TFSA), and a combination thereof. Further, as the liquid electrolyte, a combination of the ionic liquid and the organic solvent as described above may be used.

A supporting electrolyte may be dissolved in the liquid electrolyte. As the supporting electrolyte, for example, a salt composed of a lithium ion and an anion listed below may be used:

a halide anion, such as $Cl^-$, $Br^-$, and $I^-$; a boride anion, such as $BF_4^-$, $B(CN)_4^-$, and $B(C_2O_4)_2^-$; an amide anion or an imide anion, such as $(CN)_2N^-$, $[N(CF_3)_2]^-$, and $[N(SO_2CF_3)_2]^-$; a sulfate anion or a sulfonate anion, such as $RSO_3^-$ (R means hereinafter an aliphatic hydrocarbon group or an aromatic hydrocarbon group), $RSO_4^-$, $R^fSO_3^-$ ($R^f$ means hereinafter a fluorine-containing halogenated hydrocarbon group), and $R^fSO_4^-$; a phosphorus-containing anion, such as $R^f_2P(O)O^-$, $PF_6^-$, and $R^f_3PF_3^-$; an antimony-containing anion such as $SbF_6^-$; or an anion of a lactate, a nitrate ion, trifluoroacetate, or tris(trifluoromethanesulfonyl)methide.

Examples of the supporting electrolyte include $LiPF_6$, $LiBF_4$, lithium bis(trifluoromethanesulfonyl)amide (LiN$(CF_3SO_2)_2$, hereinafter referred to as "LiTFSA"), $LiCF_3SO_3$, $LiC_4F_9SO_3$, $LiC(CF_3SO_2)_3$ and $LiClO_4$, and LiTFSA may be used preferably. A combination of two kinds or more of such supporting electrolytes may be also used. Although there is no particular restriction on the addition amount of the supporting electrolyte to the liquid electrolyte, approximately 0.1 to 1 mol/kg is preferable.

The polymer electrolyte which may be used as an electrolyte, may be used together with, for example, an ionic liquid and contain preferably a lithium salt and a polymer. As the lithium salt, for example, a lithium salt used as the supporting electrolyte as described above may be used. As the polymer, there is no particular restriction insofar as it can form a complex with the lithium salt, and examples thereof include polyethylene oxide.

The gel electrolyte which may be used as an electrolyte, may be used together with, for example, an ionic liquid and contain preferably a lithium salt, a polymer, and a nonaqueous solvent. As the lithium salt, the above lithium salt may be used. As the nonaqueous solvent, there is no particular restriction insofar as it can dissolve the lithium salt, and, for example, the above organic solvent may be used. The nonaqueous solvents may be singly used, or in combination of two kinds or more. As the polymer, there is no particular restriction insofar as it can cause gelation, and examples thereof include polyethylene oxide, polypropylene oxide, polyacrylonitrile, polyvinylidene-fluoride (PVdF), polyurethane, polyacrylate, and cellulose.

As the solid electrolyte which may be used as an electrolyte, a material applicable as a solid electrolyte for an all-solid state battery may be used. For example, a sulfide type solid electrolyte, such as $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, and $Li_2S$—$P_2S_5$; an oxide type amorphous solid electrolyte, such as $Li_2O$—$B_2O_3$—$P_2O_5$, $Li_2O$—$SiO_2$, $Li_2O$—$B_2O_3$, and $Li_2O$—$B_2O_3$—$ZnO$; a crystalline oxide, such as $Li_{1.3}Al_{0.3}Ti_{0.7}(PO_4)_3$, $Li_{1+x+y}A_xTi_{2-x}Si_yP_{3-y}O_{12}$ (A is Al or Ga, $0 \leq x \leq 4$, $0 < y \leq 0.6$), $[(B_{1/2}Li_{1/2})_{1-z}C_z]TiO_3$ (B is La, Pr, Nd, or Sm, C is Sr or Ba, $Li_5La_3Ta_2O_{12}$, $Li_7La_3Zr_2O_{12}$ (LLZO), $Li_6BaLa_2Ta_2O_{12}$, or $Li_{3.6}Si_{0.6}P_{0.4}O_4$; a crystalline oxynitride such as $Li_3PO_{(4-3/2w)}N_w$ ($w<1$); or $LiI$, $LiI$—$Al_2O_3$, $Li_3N$, $Li_3N$—$LiI$—$LiOH$, or the like may be used. The sulfide type solid electrolyte is preferably used in view of superior lithium ion conductivity. Further, a semisolid polymer electrolyte, such as polyethylene oxide, polypropylene oxide, polyvinylidene-fluoride, and polyacrylonitrile, containing a lithium salt, may be also used.

The electrolyte layer in the metal air battery according to the present invention may be provided with a separator. Although there is no particular restriction on the separator, it may include, for example, a polymeric nonwoven fabric, such as a polypropylene nonwoven fabric and a polyphenylene sulfide nonwoven fabric, a microporous film of an olefinic resin, such as polyethylene and polypropylene, or a combination thereof. The electrolyte layer may be formed, for example, by impregnating a liquid electrolyte, etc., in the separator.

The negative electrode layer included in the metal air battery according to the present invention is a layer containing a negative electrode active material containing a metal. As the negative electrode active material, for example, a metal, an alloy material, and a carbon material may be used. Examples of the negative electrode active material include an alkali metal, such as lithium, sodium, and potassium; an alkaline earth metal, such as magnesium and calcium; the group 13 element such as aluminum; a transition metal, such as zinc, iron, and silver; an alloy material containing the above metals or a material containing the above metals, a carbon material such as graphite, and a negative electrode material used in a lithium-ion battery, etc.

When a material containing lithium is used as a negative electrode active material, a carbonaceous material of lithium, an alloy containing lithium element, or an oxide, a nitride, or a sulfide of lithium may be used as the material containing lithium. Examples of the alloy containing lithium element include a lithium aluminum alloy, a lithium tin alloy, a lithium lead alloy, and a lithium silicon alloy. Examples of the metallic oxide containing lithium element include a lithium titanium oxide. Examples of the metal nitride containing lithium element include a lithium cobalt nitride, lithium iron nitride, and lithium manganese nitride.

The negative electrode layer may further contain an electroconductive material and/or a binder. If, for example, the negative electrode active material is in a form of a foil, the negative electrode layer may contain only the negative electrode active material, and if the negative electrode active material is powdery, the negative electrode layer may contain the negative electrode active material and the binder. The electroconductive material and the binder may be the same as the materials which may be used for the positive electrode layer as described above.

As an outer package which may be used for the metal air battery according to the present invention, materials normally used as an outer package for an air battery, such as a metallic can, a resin, and a laminate pack, may be used.

In the outer package, a hole for supplying oxygen may be provided at any position, for example toward a surface of the positive electrode layer in contact with air. An oxygen source is preferably dry air or pure oxygen.

The metal air battery according to the present invention may include an oxygen permeable membrane. The oxygen permeable membrane may be positioned, for example, on the positive electrode layer, and particularly positioned on the air-contacting side opposite to the electrolyte layer side. As the oxygen permeable membrane, a porous membrane which allows oxygen in the air to pass and is water-repellent preventing entry of moisture, may be used, and, for example, a porous membrane made of polyester or polyphenylene sulfide may be used. A water-repellent membrane may be provided separately.

A positive electrode collector may be positioned adjacent to the positive electrode layer. The positive electrode collector may be positioned normally on the positive electrode layer, and particularly on the air-contacting side opposite to the electrolyte layer side, but it may be positioned also between the positive electrode layer and the electrolyte layer. As the positive electrode collector, materials which have been used heretofore, such as a porous structure, a network structure, a fiber, and a nonwoven fabric, including a carbon paper, metal mesh, etc., may be used without particular restrictions insofar the material is stable in the working voltage range of the metal air battery, and for example, a metal mesh made of stainless steel, nickel, aluminum, iron, titanium, or the like may be used. As the positive electrode collector, a metallic foil with oxygen supply holes may be used.

A negative electrode collector may be positioned adjacent to the negative electrode layer. As the negative electrode collector, materials which have been used heretofore, such as an electrical conductive substrate with a porous structure and a holeless metallic foil, may be used without particular restrictions insofar the material is stable in the working voltage range of the metal air battery, and for example, a metallic foil made of copper, stainless steel, nickel, or the like may be used.

There is no particular restriction on the shape of the metal air battery according to the present invention insofar as it is the shape having an oxygen intake hole, and the metal air battery may have a desired shape including a cylindrical shape, a square shape, a button shape, a coin-shape, and a flat shape.

Although the metal air battery according to the present invention can be used as a secondary battery, it may be also used as a primary battery.

Formation of the positive electrode layer and the negative electrode layer which are included in the metal air battery according to the present invention may be carried out by any heretofore known method. For example, if a positive electrode layer containing a carbon particle, a $SiO_2$ particle, and a binder is formed, an appropriate amount of a solvent such as ethanol is added to predetermined amounts of a carbon particle, a $SiO_2$ particle, and a binder and mixed, and the obtained mixture is rolled by a roll press to a predetermined thickness, and then dried and cut to form the positive electrode layer. A positive electrode collector is then pressure bonded thereto followed by vacuum drying with heating to form the positive electrode layer combined with the collector.

As an alternative method, an appropriate amount of a solvent is added to predetermined amounts of a carbon particle, a $SiO_2$ particle, and a binder and mixed to obtain a slurry, which is coated on a substrate and dried to form a positive electrode layer. If desired, the formed positive electrode layer may be pressed. As the solvent for obtaining the slurry, acetone, NMP, etc. having a boiling point of 200° C. or less may be used. Examples of a coating process for the slurry on to a substrate include a doctor blade process, a gravure transfer process, and an ink jet process. There is no particular restriction on a substrate which can be used, a collector plate which may be used as a collector, a flexible substrate in a form of a film, and a hard substrate may be used, and examples thereof include a stainless steel foil, a polyethylene terephthalate (PET) film, and a Teflon (registered trademark). The same holds true for a formation process of the negative electrode layer.

EXAMPLES

Figure 2:
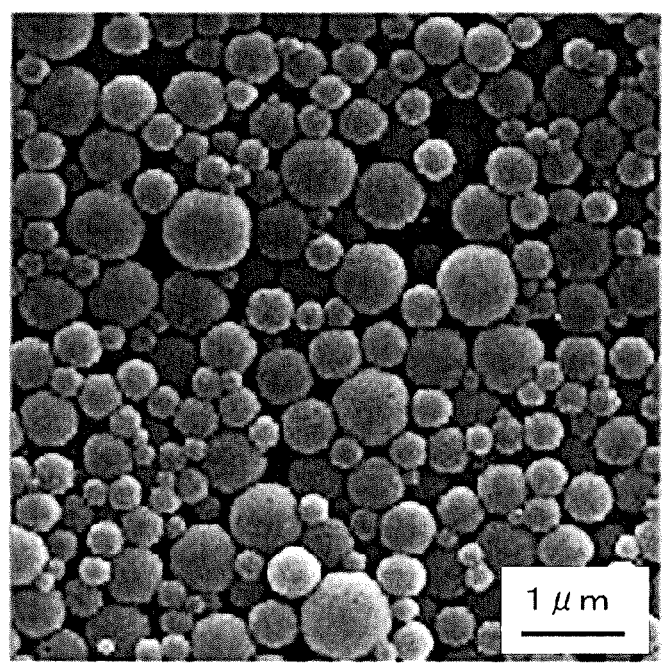
FIG. 2 is a scanning electron microscope (SEM) photograph of a $SiO_2$ particle having a low surface area, which is usable in the present invention.
Figure 3:
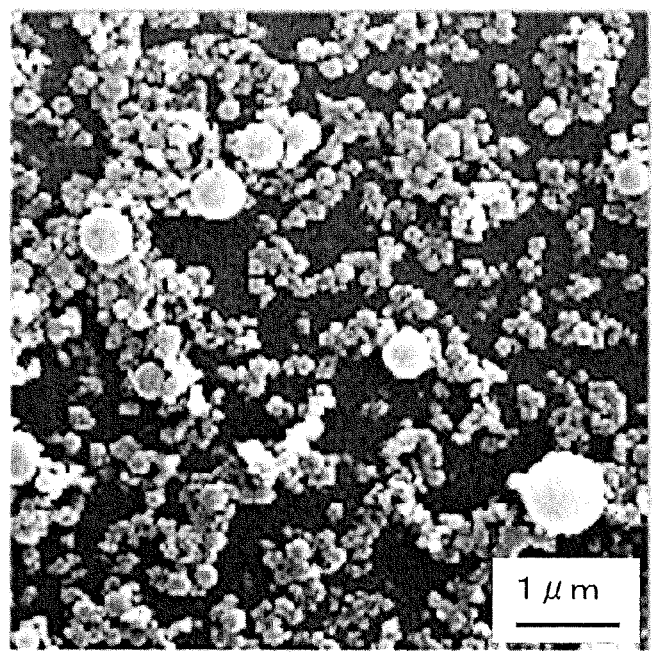
FIG. 3 is a scanning electron microscope (SEM) photograph of a $SiO_2$ particle having a low surface area, which is usable in the present invention.
Figure 4:
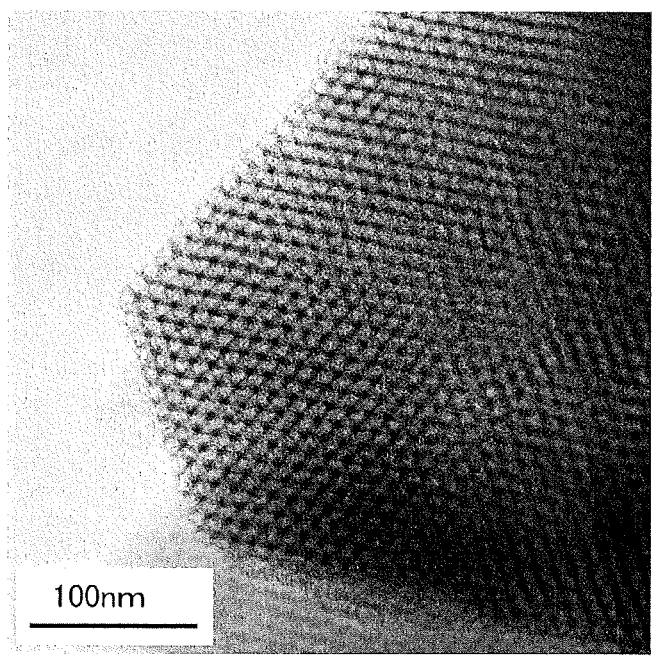
FIG. 4 is a scanning electron microscope (SEM) photograph of a $SiO_2$ particle having a high surface area, which was used in Comparative Example

Four types of $SiO_2$ particles with different specific surface areas as shown in FIGS. 1 to 4 were prepared. The $SiO_2$ particles shown by the SEM micrographs in FIGS. 1 to 3 are nonporous particles (SO—C6, SO—C2, and SO—C1; by Admatechs Co., Ltd.) with specific surface areas of 5.1 m$^2$/g, 11.5 m$^2$/g, and 16.7 m$^2$/g, and average particle diameters of 2.2 μm, 0.5 μm, and 0.25 μm respectively, as well as sphericity of 0.98 for all. The $SiO_2$ particle shown by the transmission electron microscopy (TEM) photograph in FIG. 4 is a porous particle synthesized by a template process and has a specific surface area of 620 m$^2$/g, an average particle diameter of 800 μm, and sphericity of 0.58.

A measurement of the specific surface area of the $SiO_2$ particles was performed by a volumetric gas adsorption method using a nitrogen gas as an adsorbate by BELSORP-max-N (by BEL Japan, Inc.) after a pretreatment in an atmosphere of $10^{-2}$ kPa at a temperature of 200° C. for 3 hours. The average particle diameter of the $SiO_2$ particles was measured by a laser diffraction scattering particle size distribution analyzer. The sphericity is the ratio of the major axis to the minor axis of a primary particle of $SiO_2$ and determined as the average value of measurements for 10 primary particles of $SiO_2$ based on observation images by a scanning electron microscope (SEM).

Production of Cell

Example 1

A mixture was prepared by mixing 40 wt % of Ketjen black (KB) (ECP-600JD, by Lion Corporation), 30 wt % of a polytetrafluoroethylene (PTFE) binder (F-104, by Daikin Industries, Ltd.), 30 wt % of a nonporous $SiO_2$ particle shown in FIG. 1 with the specific surface area of 5.1 m$^2$/g (SO—C6, by Admatechs Co., Ltd.), and an appropriate amount of ethanol as a solvent. The prepared mixture was rolled by a roll press, dried and cut to form a positive electrode layer with the diameter of 18 mmφ and the thickness of 130 μm. The weight ratio of $SiO_2$/KB was 0.75.

Using a 100 mesh stainless steel (SUS304) net (by The Nilaco Corporation) as a positive electrode collector, the positive electrode layer and the positive electrode collector were pressed bonded together followed by vacuum drying with heating to combine the positive electrode layer and the positive electrode collector.

Using N,N-diethyl-N-methyl-N-(2-methoxyethyl)ammonium bis(trifluoromethanesulfonyl)amide (DEMETFSA, by Kanto Chemical Co., Ltd.) as a solvent, a lithium salt of lithium bis(trifluoromethane sulfonyl)amide (LiTFSA, by Kishida Chemical Co., Ltd.) was mixed and dissolved to a concentration of 0.35 mol/kg at 25° C. for 12 hours in an Ar atmosphere to prepare an electrolyte solution.

A 500 μm-thick metal lithium foil with the diameter of 22 mmφ (by Honjo Metal Co., Ltd.) was prepared as a negative electrode layer, and a negative electrode collector made of a 2 cm-thick stainless steel (SUS304) plate with the diameter of 22 mm (by The Nilaco Corporation) adhered to a surface of the lithium foil.

Figure 5:
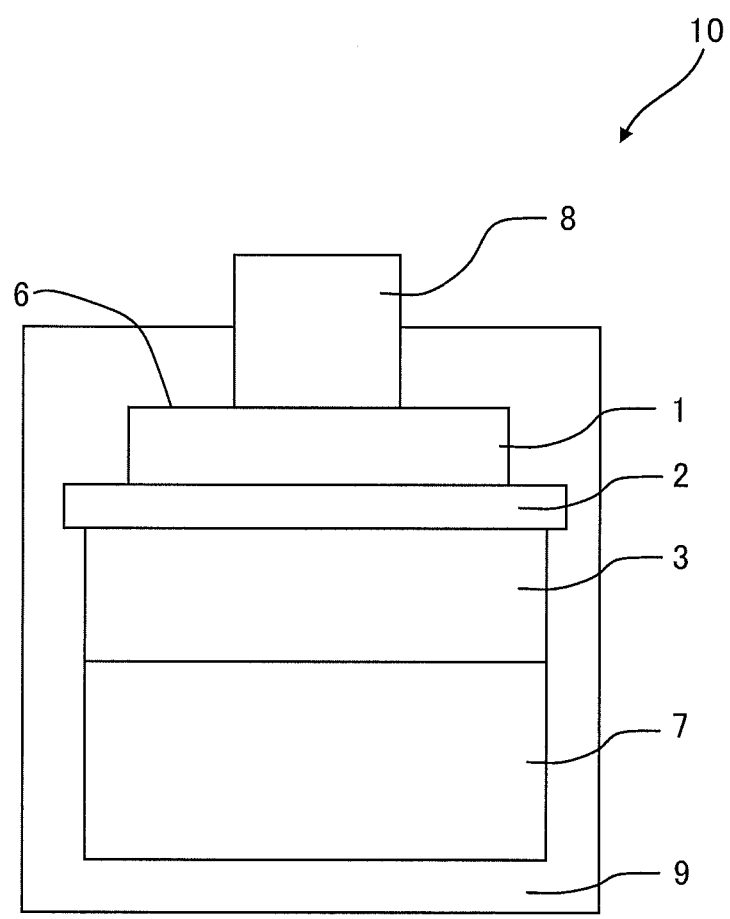
FIG. 5 is a cross-sectional schematic diagram of an example of an electrochemical cell containing a metal air battery according to the present invention.

As shown in FIG. 5, in an Ar atmosphere, a negative electrode collector 7 and a negative electrode layer 3 were placed positioning the negative electrode collector downward, into a hermetically closable metallic container 9, which intercalated an insulation resin for insulating electrically a positive electrode layer and a negative electrode layer, a 40 μm-thick polypropylene nonwoven fabric with the diameter of 28 mmφ as a separator was then placed on top of the negative electrode layer 3, 100 μL of a prepared electrolyte solution was then injected and absorbed in the separator to form an electrolyte layer 2, and a positive electrode layer 1 and a positive electrode collector 6 were then mounted so that the electrolyte solution penetrated also into voids in the positive electrode (air electrode) layer 1, thereby completing an electrochemical cell 10 for evaluation provided with a gas holder 8.

The electrochemical cell 10 was then placed in a glass desiccator (volume: 500 mL) with a cock for gas replacement, and the atmosphere in the glass desiccator was replaced with pure oxygen (99.9%, by Taiyo Nippon Sanso Corporation) to an oxygen atmosphere.

Example 2

An evaluation cell was assembled as in Example 1 except that a positive electrode was produced using, as a $SiO_2$ particle, a nonporous $SiO_2$ particle shown in FIG. 2 with the specific surface area of 11.5 $m^2/g$ (SO—C2, by Admatechs Co., Ltd.). The evaluation cell was then placed in a glass desiccator replaced with an oxygen atmosphere.

Example 3

An evaluation cell was assembled as in Example 1 except that a positive electrode was produced using, as a $SiO_2$ particle, a nonporous $SiO_2$ particle shown in FIG. 3 with the specific surface area of 16.7 $m^2/g$ (SO—C1, by Admatechs Co., Ltd.). The evaluation cell was then placed in a glass desiccator replaced with an oxygen atmosphere.

Example 4

An evaluation cell was assembled as in Example 1 except that 50 wt % of Ketjen black (KB), 30 wt % of a polytetrafluoroethylene (PTFE) binder, and 20 wt % of a nonporous $SiO_2$ particle shown in FIG. 1 with the specific surface area of 5.1 $m^2/g$ (SO—C6, by Admatechs Co., Ltd.), and an appropriate amount of ethanol as a solvent were mixed to obtain a mixture, and that the obtained mixture was rolled by a roll press, dried and cut to form a 130 μm-thick positive electrode layer with the diameter of 18 mmφ. The evaluation cell was then placed in a glass desiccator replaced with an oxygen atmosphere. The weight ratio $SiO_2$/KB was 0.40.

Example 5

An evaluation cell was assembled as in Example 1 except that 60 wt % of Ketjen black (KB), 30 wt % of a polytetrafluoroethylene (PTFE) binder, 10 wt % of a nonporous $SiO_2$ particle exhibited in FIG. 1 with the specific surface area of 5.1 $m^2/g$ (SO—C6, by Admatechs Co., Ltd.), and an appropriate amount of ethanol as a solvent were mixed to obtain a mixture, and that the obtained mixture was rolled by a roll press, dried and cut to form a 130 μm-thick positive electrode layer with the diameter of 18 mmφ. The evaluation cell was then placed in a glass desiccator replaced with an oxygen atmosphere. The weight ratio $SiO_2$/KB was 0.17.

Comparative Example 1

An evaluation cell was assembled as in Example 1 except that a positive electrode was produced using, as a $SiO_2$ particle, a porous $SiO_2$ particle shown in FIG. 4 with the specific surface area of 620 $m^2/g$. The evaluation cell was then placed in a glass desiccator replaced with an oxygen atmosphere.

Comparative Example 2

An evaluation cell was assembled as in Example 1 except that a $SiO_2$ particle was not used, and 70 wt % of Ketjen black (KB), and 30 wt % of a polytetrafluoroethylene (PTFE) binder, and an appropriate amount of ethanol as a solvent were mixed to obtain a mixture, and that the obtained mixture was rolled by a roll press, dried and cut to form a 130 μm-thick positive electrode layer with the diameter of 18 mmφ. The evaluation cell was then placed in a glass desiccator replaced with an oxygen atmosphere.

The compositions of the positive electrode layers produced in Examples 1 to 5 and Comparative Examples 1 and 2 are listed in Table 1.

TABLE 1

| | KB (wt %) | PTFE (wt %) | $SiO_2$ (wt %) | $SiO_2$ Specific surface area ($m^2/g$) | $SiO_2$ Particle diameter (μm) | $SiO_2$ Sphericity | $SiO_2$/KB Relative content |
|---|---|---|---|---|---|---|---|
| Example 1 | 40 | 30 | 30 | 5.1 | 2.2 | 0.98 | 0.75 |
| Example 2 | 40 | 30 | 30 | 11.5 | 0.5 | 0.98 | 0.75 |
| Example 3 | 40 | 30 | 30 | 16.7 | 0.25 | 0.98 | 0.75 |
| Example 4 | 50 | 30 | 20 | 5.1 | 2.2 | 0.98 | 0.40 |
| Example 5 | 60 | 30 | 10 | 5.1 | 2.2 | 0.98 | 0.17 |
| Comparative Example 1 | 40 | 30 | 30 | 620 | 800 | 0.58 | 0.75 |
| Comparative Example 2 | 70 | 30 | 0 | — | — | — | — |

(Measurement of Maximum Current Density)

The evaluation cells assembled and placed in the glass desiccator in Examples 1 to 5 and Comparative Examples 1 and 2 were allowed to stand in a thermostatic chamber at 60° C. for 3 hours prior to start of tests. Then, the I-V characteristic was measured by increasing the current density according to current application period/rest period=15 min/0.1 sec under conditions of 60° C., pure oxygen, and 1 atmospheric pressure by using a charge and discharge I-V measuring apparatus: Multichannel Potentiostat/Galvanostat VMP3 (by BioLogic). Additionally, the current density at the cut-off voltage of 2.5 V was measured for comparison. In this regard, the current density is a current value based on the unit area of the positive electrode.

Figure 6:
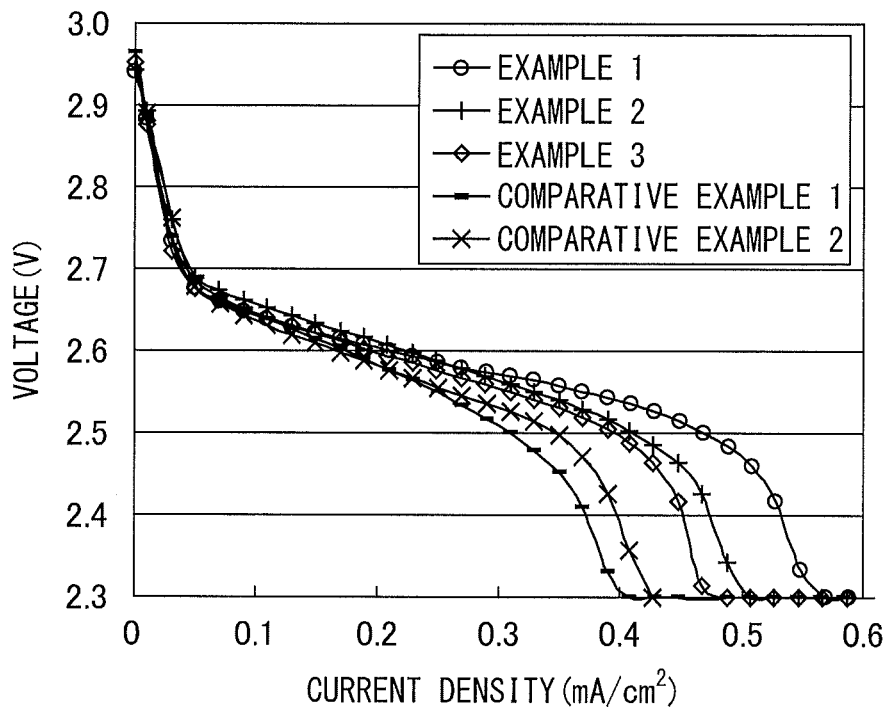
FIG. 6 is a graph showing I-V characteristics of cells produced in Examples 1 to 3 and Comparative Examples 1 and 2.
Figure 7:
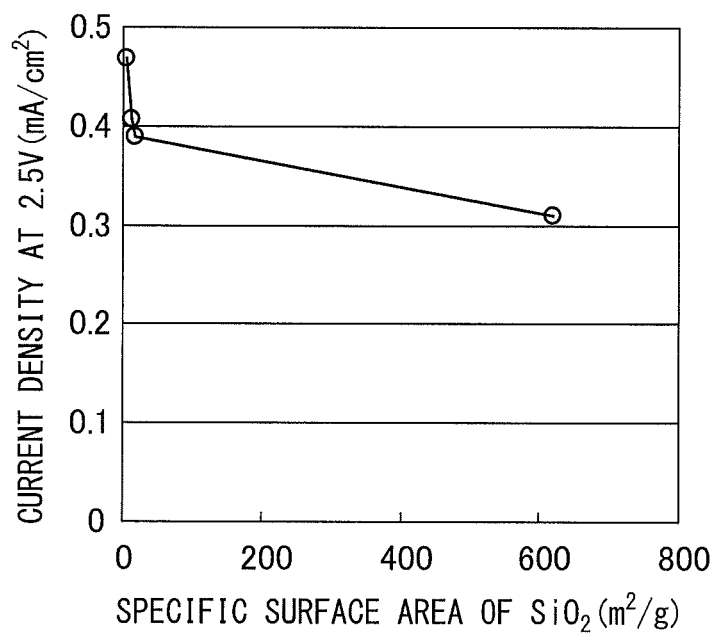
FIG. 7 is a graph showing a relationship between the specific surface area of a $SiO_2$ particle and the current density of a cell at 2.5 V.

FIG. 6 is a graph showing I-V characteristics of the cells assembled in Examples 1 to 3 and Comparative Examples 1 and 2. FIG. 7 and Table 2 show a relationship between the specific surface area of the $SiO_2$ particles and the current density of the cells at 2.5 V.

TABLE 2

| | Specific surface area of $SiO_2$ ($m^2/g$) | Current density of cell at 2.5 V ($mA/cm^2$) |
|---|---|---|
| Example 1 | 5.1 | 0.469 |
| Example 2 | 11.5 | 0.407 |
| Example 3 | 16.7 | 0.389 |
| Comparative Example 1 | 620 | 0.309 |

The smaller the specific surface area of the $SiO_2$ is, the better improvement in the current density of the cell is observed.

Figure 8:
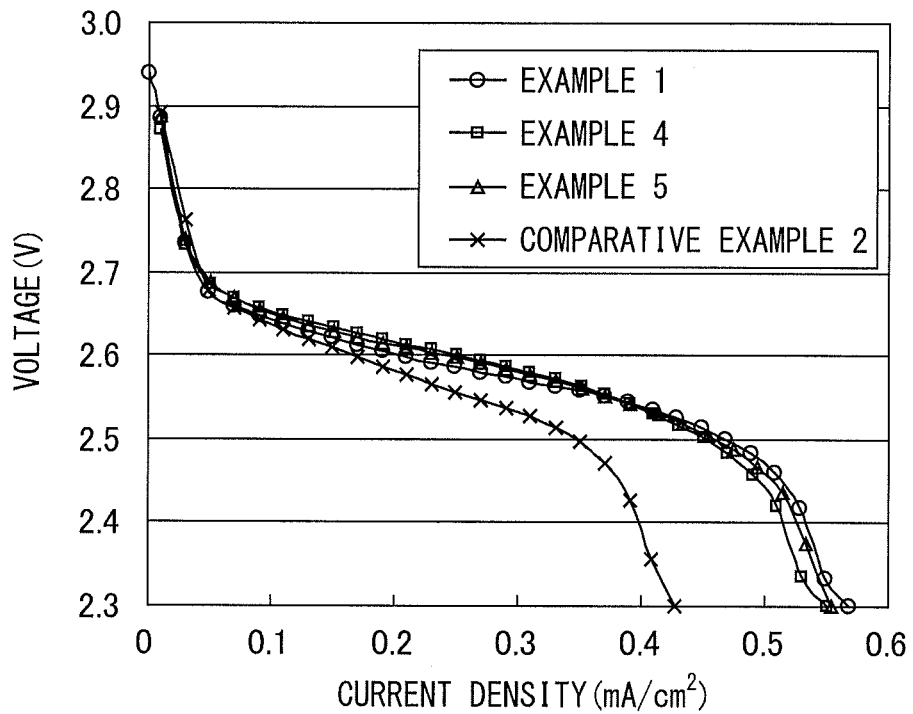
FIG. 8 is a graph showing I-V characteristics of cells produced in Examples 1, 4, and 5, and Comparative Example 2.
Figure 9:
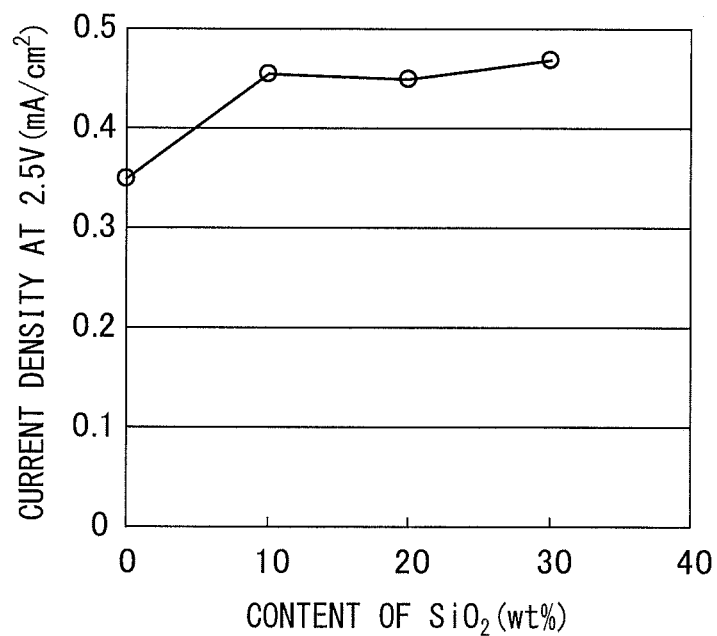
FIG. 9 is a graph showing a relationship between the content of a $SiO_2$ particle in a positive electrode and the current density of a cell at 2.5 V.

FIG. 8 is a graph showing I-V characteristics of the cells assembled in Examples 1, 4, and 5 and Comparative Example 2. While FIG. 9 and Table 3 show a relationship between the content of the $SiO_2$ in the positive electrode and the current density of the cells at 2.5 V.

TABLE 3

| | $SiO_2$ content (wt %) | Current density of cell at 2.5 V (mA/cm$^2$) |
|---|---|---|
| Example 1 | 30 | 0.469 |
| Example 4 | 20 | 0.450 |
| Example 5 | 10 | 0.454 |
| Comparative Example 2 | 0 | 0.350 |

A cell stably exhibits a high current density when the $SiO_2$ content in the positive electrode is within the range of 10 to 30 wt %.

REFERENCE SIGNS LIST

1 Positive electrode layer
2 Electrolyte layer
3 Negative electrode layer
5 Metal porous body
6 Positive electrode collector
7 Negative electrode collector
8 Gas holder
9 Hermetic container
10 Electrochemical cell

The invention claimed is:

1. A metal air battery comprising:
a positive electrode layer,
a negative electrode layer, and
an electrolyte layer positioned between the positive electrode layer and the negative electrode layer,
wherein:
the positive electrode layer comprises an electroconductive material, a binder, and a $SiO_2$ particle,
the $SiO_2$ particle is nonporous and has a specific surface area of 16.7 m$^2$/g or less, and
a primary particle of the $SiO_2$ particle has a sphericity of 0.95 to 1.0.

2. The metal air battery according to claim 1, wherein the positive electrode layer contains 10 to 30 wt % of the $SiO_2$ particle based on the total weight of the positive electrode layer.

3. The metal air battery according to claim 1, wherein a ratio of a content of the $SiO_2$ particle to a content of the electroconductive material is 0.17 to 0.75.

4. The metal air battery according to claim 1, wherein the negative electrode layer comprises a material containing lithium.

5. The metal air battery according to claim 1, wherein the electrolyte layer comprises a separator.

6. The metal air battery according to claim 1, wherein the electrolyte layer comprises an ionic liquid.

7. The metal air battery according to claim 6, wherein the ionic liquid is N,N-diethyl-N-methyl-N-(2-methoxyethyl)ammonium bis(trifluoromethanesulfonyl)amide (DEMETFSA), or N-methyl-N-propylpiperidinium bis(trifluoromethanesulfonyl)amide (PP13TFSA), or a combination thereof.

8. The metal air battery according to claim 6, wherein the electrolyte layer comprises a lithium-containing metal salt.

9. The metal air battery according to claim 8, wherein the lithium-containing metal salt is lithium bis(trifluoromethanesulfonyl)amide (LiTFSA).

\* \* \* \* \*